(12) United States Patent
Dietz

(10) Patent No.: US 7,238,401 B1
(45) Date of Patent: Jul. 3, 2007

(54) GLAZING ELEMENT AND LAMINATE FOR USE IN THE SAME

(75) Inventor: Peter T. Dietz, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 164 days.

(21) Appl. No.: 09/591,584

(22) Filed: Jun. 9, 2000

(51) Int. Cl.
*B32B 33/00* (2006.01)

(52) U.S. Cl. ............... 428/41.7; 428/480; 428/426; 428/40.1; 428/41.3; 428/343

(58) Field of Classification Search .............. 428/343, 428/352, 354, 355, 345, 216, 337, 421, 40.1, 428/425.6
See application file for complete search history.

(56) References Cited

U.S. PATENT DOCUMENTS

| | | | |
|---|---|---|---|
| RE24,906 E | 12/1960 | Ulrich | 206/59 |
| 4,028,475 A * | 6/1977 | Willdorf | 428/215 |
| 4,072,779 A | 2/1978 | Knox et al. | 428/220 |
| 4,112,171 A * | 9/1978 | Motter et al. | 428/213 |
| 4,157,417 A * | 6/1979 | Murphy | 428/344 |
| 4,211,823 A | 7/1980 | Suzuki et al. | 428/412 |
| 4,242,403 A | 12/1980 | Mattimoe et al. | 428/213 |
| 4,634,637 A | 1/1987 | Oliver et al. | 428/622 |
| 4,683,172 A | 7/1987 | LeGrand et al. | 428/412 |
| 4,797,317 A * | 1/1989 | Oliver et al. | 428/204 |
| 4,812,359 A | 3/1989 | Hall | 428/332 |
| 4,857,376 A | 8/1989 | Von Reis et al. | 428/83 |
| 4,898,786 A | 2/1990 | Swofford | 428/480 |
| 4,945,002 A | 7/1990 | Tanuma et al. | 428/425 |
| 5,002,326 A | 3/1991 | Westfield et al. | 296/95.1 |
| 5,085,721 A | 2/1992 | Tanuma et al. | 156/108 |
| 5,118,540 A * | 6/1992 | Hutchison | 359/360 |
| 5,145,744 A | 9/1992 | Cartier et al. | 428/423.7 |
| 5,427,842 A | 6/1995 | Bland et al. | 428/213 |
| 5,604,019 A | 2/1997 | Bland et al. | 428/212 |
| 5,645,940 A * | 7/1997 | Teddington et al. | 156/103 |
| 5,677,050 A * | 10/1997 | Bilkadi et al. | 428/331 |
| 5,741,549 A | 4/1998 | Maier et al. | 427/294 |
| 5,759,274 A | 6/1998 | Maier et al. | 118/410 |

(Continued)

FOREIGN PATENT DOCUMENTS

EP 0 317 858 5/1989

(Continued)

OTHER PUBLICATIONS

ASTM D1003.

(Continued)

*Primary Examiner*—Hai Vo
(74) *Attorney, Agent, or Firm*—Harold C. Knecht, III

(57) ABSTRACT

A multi-layer optically clear laminate suited for attachment to window glass to provide a glazing element which has reduced spall and lacerative consequences on fracture impact of the window glass is provided by the invention. The laminate is comprised of at least two films of nonadhesive polymeric material directly adhered together by pressure sensitive adhesive and includes an exposed surface covered with a hard coat composition and an opposite surface covered with an ambient temperature attachable pressure sensitive adhesive. A glazing element comprised of the laminate attached to glass is also provided.

37 Claims, 1 Drawing Sheet

U.S. PATENT DOCUMENTS

| | | | |
|---|---|---|---|
| 5,882,774 A | 3/1999 | Jonza et al. | 428/212 |
| 6,013,722 A * | 1/2000 | Yang et al. | 524/558 |
| 6,033,785 A * | 3/2000 | Tanaka et al. | 428/426 |
| 6,034,813 A * | 3/2000 | Woodard et al. | 359/360 |
| 6,049,419 A | 4/2000 | Wheatley et al. | 359/359 |
| 6,143,387 A * | 11/2000 | Kubler et al. | 428/41.7 |

FOREIGN PATENT DOCUMENTS

| | | |
|---|---|---|
| EP | 0 319 911 | 6/1989 |
| EP | 0 353 677 | 2/1990 |
| EP | 0 527 080 | 2/1993 |
| EP | 0 591 055 | 7/1998 |
| EP | 0 893 248 | 1/1999 |
| EP | WO99/30905 | 6/1999 |
| JP | 63-57228 | 3/1988 |
| WO | WO94/13467 | 6/1994 |
| WO | WO97/01778 | 1/1997 |

OTHER PUBLICATIONS

ASTM D-4065.

ANSI/SAE Z26.1-1990.

Dupont Product Information Melinex Polyester Film.

* cited by examiner

GLAZING ELEMENT AND LAMINATE FOR USE IN THE SAME

BACKGROUND OF THE INVENTION

1. Field of the Invention

This invention relates to a multi-layer optically clear laminate suited for attachment to window glass to provide a glazing element which has reduced spall and lacerative consequences on impact fracture of the window glass and to glazing elements made with the same.

2. Description of Related Art

The invention of laminated glass windshields for use in motor vehicles has substantially reduced injuries caused by occupant-windshield impacts resulting from automobile accidents. Such laminated windshields are made by laminating under heat and pressure two glass plates with an interlayer of a tough, transparent, extensible, material such as polyvinyl butyral (PVB). While such a laminated windshield provides some degree of protection for motor vehicle occupants, it is still generally conventional to utilize unlaminated glazing elements for fabricating the other windows of automobiles. While such windows are typically tempered so that on impact they fracture in small irregular pieces without producing knife-like shards, they still provide a hazard to the occupants of a motor vehicle. The impact fracture of such automotive glazing typically produces what is called "spall." Spall is the shower of glass splinters that typically results from the impact fracturing of automotive glazing. Such glass splinters could have a lacerative effect on the occupants of the motor vehicle and on any air bag that may have been inflated as a result of the automobile accident.

There is a growing trend to replace tempered glass with laminated glass (glass/PVB/glass) as motor vehicle sidelights to provide additional safety. However, when laminated sidelights are broken, they typically leave sharp glass shards attached to the PVB interlayer which can cause severe laceration to the occupants of the vehicle. Thus, a need exists for an acceptable anti-spall, anti-lacerative (ASL) film that will provide a barrier between the broken glass shards and the vehicle occupant to minimize the opportunity for laceration.

Furthermore, in the case of automobiles, there is a practice called "smash and grab" utilized by thieves intending to steal the contents of automobiles which provides immediate access on impact of tempered glass automotive windows. A need also exists for a stronger window film which will sustain such fractures without rupture.

The impact fracture problem also exists in the case of architectural glazing where tempered or annealed glass panels are employed for windows and doorways. Impact fracturing of such glass panels may cause spall which would be a hazard to anyone in the immediate vicinity of the fractured panel.

The use of laminates to reinforce glazing is well known. For example, U.S. Pat. No. 4,072,779 (Knox, et al.) is directed to a laminate which includes a frangible, transparent, asymmetrically oriented polyethylene terephthalate film laminated to a polyvinyl butyral sheet and coated on the opposite surface with an abrasion-resistant coating. This laminate is adhered to a glass panel by sandwiching it between the glass panel and a second glass panel under heat and pressure and discarding the nonadhered glass panel once the lamination is completed. It is believed that the laminate is commercially available from the E.I. DuPont de Nemours and Company, Circleville, Ohio under one or more of the tradenames SENTRY GLASS™ and BE-1028 SPALLSHIELD™ sheeting.

U.S. Pat. No. 4,112,171 (Motter, et al.) discloses a laminate which is said to provide anti-lacerative and anti-spall properties. U.S. Pat. No. 4,945,002 (Tanuma, et al.) discloses an impact-resisting anti-lacerative window glass unit comprised of two exterior plate-like members made of a transparent organic first polymer and a transparent organic second polymer or glass plate to provide a multilayered structure wherein the intermediate layer could be polyethylene terephthalate.

U.S. Pat. No. 4,683,172 (LeGrand, et al.) discloses a safety or impact resistant laminate comprised of at least two laminae with an interlayer imposed therebetween bonded together by contact or pressure sensitive adhesive. The interlayer is said to be what is know in the art as an adhesive interlayer such as polyvinyl butyral.

While there is a multitude of patents disclosing various combinations of providing anti-spall and anti-lacerative laminates, none has produced a commercially acceptable product which is easy to apply under ambient conditions to provide a commercially acceptable result. Many of the products are relatively thick and thus difficult to apply, requiring heat, pressure and/or expensive application equipment. Others may not withstand the rigors of changing seasons where during winter an automotive interior may be cooled to frigid temperatures and in the summer may be heated to a sweltering temperature. Others have inherent problems because of incompatibility of some of the materials forming the laminate. Some materials will cause undesirable optical patterns when attached to automotive glazing material. Still others are frangible and do not provide the necessary strength to sustain a fracture producing impact of the glass panel while still providing the anti-spall and anti-lacerative effect.

SUMMARY OF THE INVENTION

The invention provides an optically clear laminate suited for attachment to tempered or laminated window glass to provide a glazing element which has reduced spall and lacerative consequences on impact fracture of the window glass. The laminate is easily installed under ambient conditions with an inexpensive roller and, once installed, provides superior anti-spall and anti-lacerative properties and sufficient strength, even after impact fracture, to deter smash and grab thieves. The laminate comprises:

(a) a first lamina comprised of optically clear flexible nonadhesive polymeric material having a first major surface and an opposite second major surface;
 (b) a scratch-resistant hard coating over said first major surface to provide an exposed surface to the laminate;
 (c) at least one additional lamina comprised of optically clear flexible nonadhesive polymeric material;
 (d) a sufficient number of layers of in situ optically clear pressure sensitive adhesive layers to directly bond said laminae together with the hard coating exposed; and
 (e) a layer of in situ optically clear, ambient-temperature-attachable, pressure sensitive adhesive to bond said laminate to window glass.

The preferred laminates of the invention include pressure sensitive adhesive compositions having a shear storage modulus in the range of about 0.20 to 0.50 MPa when measured at 22° C. The preferred shear storage modulus is about 0.3 MPa.

The invention further provides an optically clear glazing element which has reduced spall and lacerative consequences on impact fracture. The glazing element comprises the optically clear laminate of the invention adhered to tempered or laminated window glass.

The preferred optically clear laminate of the invention comprises the following components which are adhered together in the order shown below:
(a) a first biaxially oriented polyester film having a thickness of not more than about 5 mils (0.13 mm);
(b) a first pressure sensitive adhesive layer;
(c) a second biaxially oriented polyester film having a thickness of not more than about 5 mils (0.13 mm);
(d) a second pressure sensitive adhesive layer;
(e) a third biaxially oriented polyester film having a thickness of not more than about 5 mils (0.13 mm); and
(f) a third ambient-temperature-attachable pressure sensitive adhesive layer.

The laminates according to the invention are preferably relatively thin in overall thickness to facilitate easy mounting under ambient conditions on flat or curved glass surfaces by application of pressure by use of a simple roller. Preferably the total laminate thickness does not exceed about 20 mils (0.5 mm), more preferably does not exceed about 15 mils (0.38 mm) and most preferably does not exceed about 12 mils (0.3 mm). Suitable laminates may have a thickness in the range of about 8 to 10 mils (0.2 to 0.25 mm). The total laminate thickness is the combined thickness of all of its components except that of the release liner. The lower useful practical thickness is that at which the laminate becomes too flimsy to be readily handled, no longer has the desired physical properties or is too difficult to process. The total thickness preferably exceeds about 5 mils (0.13 mm).

The laminates of the invention have lamina comprised nonadhesive polymeric material that are "directly" adhered together by pressure sensitive adhesive, with no adhesive interlayers other than the layer of pressure sensitive adhesive, to provide a tough laminated structure which will easily retain impact fractures.

BRIEF DESCRIPTION OF THE DRAWINGS

For a better understanding of the invention, reference is made to the attached drawing, wherein.

DETAILED DESCRIPTION

Figure 1:
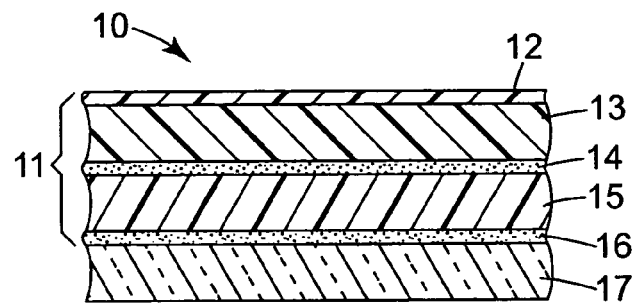
FIG. 1 is an enlarged sectional view of an optically clear glazing element of the invention.

Referring to FIG. 1 of the drawing, a laminate 11 according to the invention comprises hard coat 12 adhered to plastic film 13 which is laminated to plastic film 15 by pressure sensitive adhesive layer 14 and includes on the opposite side of plastic film 15 a layer of ambient-temperature-attachable pressure sensitive adhesive 16 for mounting laminate 11 to the attachment surface of a sheet of glass 17. Glazing element 10 is provided when laminate 11 is adhered to a sheet of glass 17. By "ambient-temperature-attachable" is meant that the pressure sensitive adhesive may be adhered to the surface of glass without requiring external heating of the elements, although in some cases, moderate heating may be employed to provide better conformability.

Figure 2:
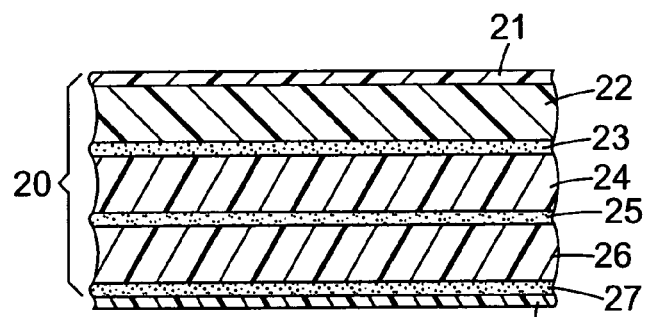
FIG. 2 is an enlarged sectional view of an optically clear laminate of the invention.

A preferred laminate 20 according to the invention is shown in FIG. 2 of the drawing. It includes hard coat layer 21 adhered to first plastic film 22 which is laminated to second plastic film 24 by pressure sensitive adhesive layer 23. Second plastic film 24, in turn, is laminated to third plastic film 26 by pressure sensitive adhesive layer 25. An additional ambient-temperature-attachable pressure sensitive adhesive layer 27 is on the opposite side of plastic film 26 for mounting the laminate to the surface of a glass window. For convenience in storing the laminate it is preferred to have a release liner 28 to protect the exposed surface of mounting adhesive layer 27.

The hard coat 12 or 21 may be obtained by applying any commercially available hard coating composition to the surface of plastic film 13 or 22, as the case may be, provided that the resultant hard coated layer dries to form a scratch-resistant surface which will pass the abrasion for plastics test established by the American National Standard for Safety Glazing Materials for Glazing Motor Vehicles and Motor Vehicle Equipment Operating on Land Highways safety code (ANSI/SAE Z26.1-1996) approved by the American National Standards Institute Aug. 11, 1997, incorporated herein by reference.

A preferred hard coating composition is a ceramer coating composition comprising an organic resin and silica particles as described in assignee's U.S. Pat. No. 5,677,050, incorporated herein by reference. This coating composition may comprise about 20% to about 80% of ethylenically unsaturated monomers; about 10% to about 50% of acrylate functionalized colloidal silica; and about 5% to about 40% of N,N-disubstituted acrylamide monomer or N-substituted-N-vinyl-amide monomer; wherein the percentages are by weight of the total weight of the coating. The coating is then cured to provide an abrasion-resistant, light transmissive ceramer coating on the top film lamina of the laminate. The hard coating is preferably applied to the film before it is used to form the laminate.

The amide monomer should be a N,N-disubstituted monomer on a &-N-vinyl-amide monomer. It has been discovered that use of an acrylic acid or acrylic ester in place of the N,N-disubstituted acrylamide or N-substituted-N-vinyl-amide monomer yields coatings that adhere poorly to polycarbonate surfaces and do not weather well. The use of acrylated urethanes in place of the N,N-disubstituted acrylamide or N-substituted-N-vinyl-amide monomer results in intractable compositions.

The N,N-disubstituted acrylamide or N-substituted-N-vinyl-amide monomer should also have a molecular weight between 99 (the molecular weight of N,N-dimethylacrylamide) and 500 atomic mass units. This molecular weight range is desired for stabilizing the silica particles and for proper functioning of the coating.

In the present invention, the term "ceramer" is used to identify a fluid comprising surface-modified colloidal silica particles dispersed in a free-radically polymerizable organic liquid. The term "cured ceramer" is used to identify a material comprising inorganic (specifically, silica) particles attached or connected via covalent linkages to a crosslinked organic matrix. The term "acrylate," as used herein, encompasses acrylates and methacrylates. The term "disubstituted nitrogen" means that the acrylamide nitrogen atom, in addition to being the nitrogen of the acrylamide, has two substituents covalently bonded to the nitrogen. The term "optically clear," means that the laminate or any of its components, e.g., hard coating, film or pressure sensitive adhesive layer in situ exhibit a light transmittance, as measured by ASTM D1003, of at least 75%, preferably at least 85% and more preferably at least 90%.

The ceramer composition or other hard coating compositions can be coated on the film by methods known in the art, including: extrusion coating, spraying, flowing, rolling, dip coating or knife coating. In many applications it is desirable to coat the film without allowing the coating composition to flow onto the backside of the film because this may diminish its optical characteristics. After the composition is coated onto the film, it is cured to form the abrasion-resistant ceramer coating. Since the film has a front surface made from a thermoplastic material, it is important in many instances that curing is conducted at a temperature below that at which the thermoplastic material deforms, and is preferably irradiated by UV light at room temperature in an air atmosphere.

The ceramer coating provides both excellent abrasion resistance and good flexibility. Coatings also adhere to polymer films especially polycarbonate films, without fogging, hazing or the addition of priming agents.

The ceramer coating also has the ability to withstand outdoor conditions with excellent resistance to moisture, light and heat; resistance to cracking and peeling; desirable optical properties such as transparency; and resistance to chemical attack and unwanted coloration.

Moreover, the coatings can be easily formulated, applied and cured, and they can be used without a primer layer because of their ability to bond directly to the surface of the polymer film. Curing of the coatings may be conducted in air at room temperature.

The coating thickness of the hard coating may vary from about 0.1 mil (0.003 mm) to about 0.3 mil (0.008 mm), but preferably is on the order of 0.004 mm to provide an add on weight to the coated sheet of about 1.5 gram per square meter to 3.8 grams per square meter.

Polymeric film 13, 14, 22, 24 and 26 may be comprised of any polymeric material which is nonadhesive that may be formed into a sheet which is of substantially uniform thickness along its entire area and is optically clear with substantially no surface imperfections which might interfere with optically clarity. The term "nonadhesive" means that the polymeric material used to form the film is not an adhesive type material such as conventionally used to make glass or layered film laminates. Such adhesive polymeric materials would include thermoplastic adhesive materials such as polyvinyl butyral, ethylene terpolymers, epoxies, polyurethanes, silicones and acrylic polymers. The polymeric films may vary in thickness from about 0.5 mil to about 10 mils (0.013 to 0.25 mm), but preferably do not exceed about 5 mils (0.13 mm) in thickness. The films may be made of polymeric material such as polyethylene-terephthalate which when formed into a sheet, biaxially oriented and heat set provides a high breaking strength film with excellent optical properties. Certain useful polymeric films such as polycarbonate and polyurethane films are typically cast and thus not biaxially oriented to improve strength. Preferably, the polymeric films are primed or corona treated to improve adhesion between coatings and adhesive layers.

In an alternative embodiment, one of the layers of polymeric film may be replaced with an infrared reflecting optical film. Such films include dielectric multi-layer optical films disclosed in assignee's U.S. Pat. Nos. 5,882,774 and 6,049,419 and WO97/01778, each of which is incorporated herein by reference. Such films, which are polymeric having no additional metal layer, are particularly useful for being laminated to curved glass panels.

A useful conformable infrared reflecting film which may be applied to non-planar glass substrates to provide a wrinkle-resistant laminate is disclosed in assignee's U.S. Patent application bearing attorney's docket No. 55416USA8A, entitled Wrinkle-Resistant Infrared Reflecting Film and Non-Planar Laminate Articles Made Therewith. That application is incorporated herein by reference and has the same filing date as the present application.

A preferred primed polymeric film is commercially available from the E.I. DuPont de Nemours and Company under the trade designation MELINEX™ polyester film type 454-200. The preferred film has a thickness of about 50 μm (200 gauge) and has an elongation at break of about 150 percent and a tensile strength of about 20 kgf/mm$^2$ in the machine direction and 25 kgf/mm$^2$ in the transverse direction.

The polymeric film or coating may be modified to provide other desired properties to the laminate. For example, one or more of the laminae or coating may be treated with or composed of a material which can reflect infrared light, ultraviolet light, sunlight or other forms of unwanted radiant energy. As an example, the solar reflecting film may be that available under the trade designations XIR™-70 and XIR™-75 from Southwall Technologies, Inc. of Palo Alto, Calif. The film or coating may also be treated with or composed of materials which would prevent viewing therethrough to provide privacy to the vehicle occupants. As an example, a film which acts as a light polarizer may be employed as one of the films of the laminate. The films or the coating may also be colored by the addition of suitable colorants. The coating may also be provided with an anti-fogging agent to prevent its surface from fogging under certain conditions or a material that provides a surface which resists smudging. The coating and/or one or more of the films may be modified to be electrically conductive to provide an electrically conductive path for certain applications such as to provide an antenna or a heating element to eliminate or reduce fogging, mist or frost. The laminate or one or more of its components may also be embossed or treated to provide a holographic pattern for decorative or functional reasons. The modifications, additives or compositions which provide these properties are well known and they may be provided over the full expanse of the laminate or over portions of the laminate, in functional or decorative patterns.

The pressure sensitive adhesive layers between plastic films, i.e., adhesive layers 14, 23 and 25 may comprise any relatively soft pressure sensitive adhesive material that is in situ optically clear. That is, the pressure sensitive adhesive material may, itself, not be optically clear in a free standing condition but once incorporated into the laminate will have an optically clear condition and sufficient adhesion to maintain the layers of the laminate in an unaltered form over any of a wide variety of climatic conditions including severe freezing conditions and sweltering heat as may be encountered in areas near the Equator. The adhesive should also be sufficient to maintain the laminate unaltered through any boiling water test according to the standards of ANSI/SAE.

Preferred pressure sensitive adhesive compositions are relatively soft materials which provide a conformable laminate. Such soft pressure sensitive adhesive compositions are characterized by having a shear storage modulus as measured by Dynamic Mechanical Analysis (DMA) at 22° C. in the range of about 0.20 to about 0.50 MPa; preferably, the shear storage modulus at 22° C. is no greater than 0.50 MPa, more preferably, no greater than 0.40 MPa, and most preferably about 0.30 MPa. Pressure sensitive adhesives having a shear storage modulus of 0.20 MPa or lower are generally not preferred because they generally have insufficient adhesion especially under warm conditions. The shear storage modulus may be calculated from the shear stress measured in the temperature range of −20° C. to 100° C. using an amplitude of 15 micron, and a frequency of 1 hertz. More details about this measurement may be found in ASTM D-4065-95, Standard Practice for Determining and Reporting Dynamic Mechanical Properties of Plastics.

Preferred pressure sensitive adhesive compositions are based on acrylate or acrylic copolymers and terpolymers with the most preferred adhesive composition being those disclosed in assignee's Ulrich U.S. Reissue Pat. No. 24,906.

The thickness of the pressure sensitive adhesive layers utilized to adhere the polymeric film layers may vary from about 0.1 mil to about 1 mil (0.003 to 0.03 mm), but preferably is on the order of 0.3 mil (0.02 mm).

The layer of pressure sensitive adhesive intended to mount the laminate to the surface of a glass sheet, e.g., layers 17 and 27, will have the same physical properties as the pressure sensitive adhesive utilized to adhere together the polymeric film layers, but the thickness of the mounting layers may vary from about 0.1 mil to about 2 mils (0.003 to 0.05 mm), but preferably is on the order of 0.8 mil (0.02 mm).

The glass to which the laminate may be attached may have any conventional structure or composition. For example, the glass may be laminated, as in conventional windshield glass, tempered, annealed, heat strengthened or, in fact, may be a rigid sheet of hard polymeric material such as a sheet of polymethylmethacrylate resin such as that sold under the trade designation LUCITE™. Preferred glass substrates are either tempered or laminated.

Release liner 28 may comprise any conventional sheet material which has temporary weak adhesion for the pressure sensitive adhesive surface to which it is applied and will strip cleanly from that surface to leave an unaltered layer of pressure sensitive adhesive for attachment to the surface of a glass sheet.

Figure 3:
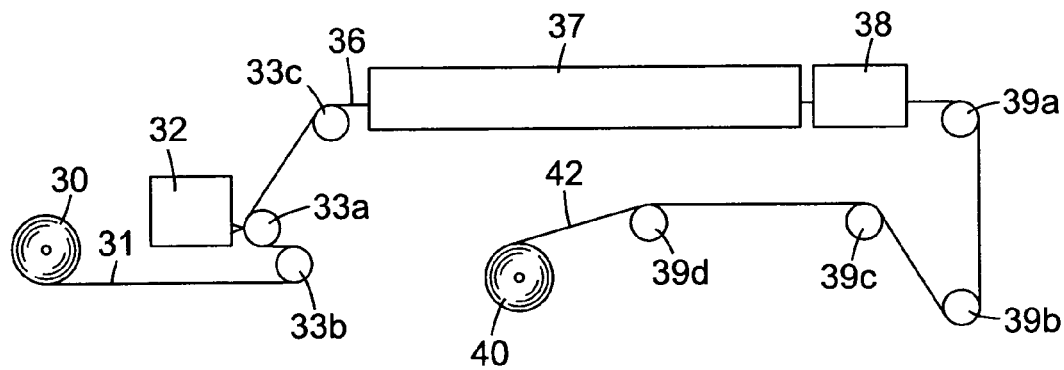
FIGS. 3 and 4 are schematic diagrams showing details of the preparation of the laminate of the invention.
Figure 4:
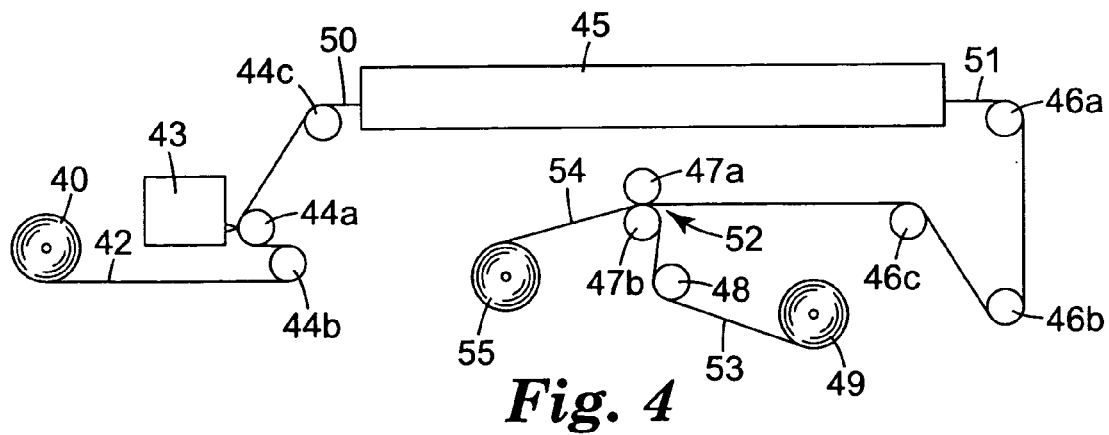

The laminate 11 depicted in FIG. 1 may conveniently be prepared by utilizing equipment schematically shown in FIGS. 3 and 4. As shown in FIG. 3, a roll 30 of polymeric film such as that available under the trade designation MELINEX™ 454-200 film is obtained from a commercial source. Plastic film 31 is drawn from roll 30, passed over roll 33b and 33a which deploys film 31 to receive a coating of the hard coat material from coater 32 to provide a wet coating of coating material which will dry to an add on weight on the order of 0.1 to 0.5 gram per square foot (0.8 to 3.8 grams per square meter), preferably 0.3 gram per square foot (3.2 grams per square meter). Coater 32 may be any convenient coating device such as one including a slot die to provide a uniform coating to the surface of film 31. The slot die may have an opening on the order of 2 to 6 mils (0.05 to 0.15 mm), but preferably the opening is on the order of 4 mils (0.1 mm) to obtain the preferred 0.3 gram per square foot (3.2 grams per square meter) add on weight. The coating solution may be any commercially available hard coating solution which has the appropriate viscosity to make it coatable. In some cases it may be necessary to dilute the coating solution with additional solvent to provide a more desirable coating viscosity.

The preferred coating device is that disclosed in U.S. Pat. Nos. 5,741,549 and 5,759,274, incorporated herein by reference. Other coating devices such as a rotogravure coating roll may be used provided that it results in a uniform coating of the hard coat material.

The coated film is passed over roll 33a and then 33c to align it so that coated film 36 may be passed through tunnel oven 37 which preferably is about 120 feet (36.5 meters) in length and has 3 heated zones of 40 feet (12.2 meters) each with zones 1, 2 and 3 being heated respectively at 110° F. (43° C.), 120° F. (49° C.) and 120° F. (49° C.). The coated film may be passed at any convenient speed to assure solvent removal. Preferably, the speed is in the order 55 feet (17 meters) per minute under a film tension of 1 pound per inch (0.18 kg per cm). The film with the dried coating is then passed through curing station 38 which is fitted with a UV source such as high pressure mercury bulbs with a total power output of 67 kilowatts having parabolic reflectors to direct the light to the coated surface of the film producing coated film 42 which exits curing station 38 and is then passed over idler rolls 39a, 39b, 39c, 39d and wound into storage roll 40 for further processing. During drying, forced air is passed through oven 37 in a direction opposite to the direction of film movement.

The hard coated polymeric film on storage roll 40, as depicted in FIG. 4, is then coated with pressure sensitive adhesive to apply a dry coating of pressure sensitive adhesive on the order of 0.1 to 1 mil (0.003 to 0.03 mm), preferably 0.3 mil (0.008 mm) to the surface of coated film 42 opposite that with the hard coat. After the pressure sensitive adhesive layer is applied and dried, a second polymeric film which may be of the same composition as the first polymer film is laminated to the first polymer film by the technique schematically shown in FIG. 4. Film 42 is unwound from roll 40, over idler rolls 44b and 44a past coater station 43 where a solution of the pressure sensitive adhesive is applied in a uniform thickness which will ultimately dry to a thickness preferably of 0.3 mil (0.008 mm), then over idler roll 44c and the adhesive coated film 50 is passed through tunnel oven 45 which has 4 heated zones with zones 1, 2, 3 and 4 being heated respectively at 80° F. (27° C.), 130° F. (54° C.), 220° F. (104° C.) and 200° F. (93° C.). The slot die for applying the adhesive solution to the film preferably has an opening of about 15 mils (0.38 mm) to provide 0.3 mil (0.008 mm) dry coating. The coated sheet is passed through the oven at a speed of 100 feet per minute under tension of 1 pound per inch (0.18 kg per cm). The dried film 51 exits the tunnel oven and is passed over idler rolls 46a, 46b, 46c to laminator 52 consisting of opposed rolls 47a and 47b where the second polymeric sheet 53 taken from roll 49 is passed over idler roll 48 into the nip between rolls 47a and 47b where the films are laminated together to provide laminated film 54 which is wound onto storage roll 55. Roll 47a is a steel roll which preferably is a 16 inch (40 cm) diameter steel roll which is heated at 160° F. (71° C.) and roll 47b preferably is an 18 inch (46 cm) diameter rubber back-up roll comprised of rubber having a shore A durometer 65. These rolls are forced together under a force of 20 pounds per lineal inch (3.6 kg per lineal cm) during the laminating process.

The 2 layer laminate 54 on storage roll 55 is then replaced for roll 49 in the apparatus depicted in FIG. 4. A fresh uncoated roll of polymer film is installed in place of roll 40 of the apparatus depicted in FIG. 4 and it is coated with a 0.3 mil dry coating of pressure sensitive adhesive by coater 43, passed through tunnel over 45 to dry and laminated to laminate 53 at laminator 52, as described above, to provide a 3-film laminate 54 which is wound as roll 55 shown in FIG. 4.

The three film laminate 54 on storage roll 55 is then passed again through the same apparatus depicted in FIG. 4 to apply the attachment pressure sensitive adhesive layer and apply a 2 mil (0.5 mm) silicon coated polyester release liner to the freshly coated adhesive layer. In this case the attachment pressure sensitive adhesive layer is extruded from a 15 mil (0.38 mm) slot die to obtain a dry coating thickness of 0.8 mil (0.02 mm). The laminating temperature in the case of the attachment of the release liner is 160° F. (71° C.).

EXAMPLES

The invention will be more fully understood by reference to the following examples wherein all parts and percentages are by weight unless otherwise indicated.

Adhesive A Solution (IOA/MA/AA weight ratio 57.5/35/7.5) A mixture of 87.4 grams isooctylacrylate (IOA), 53.2 grams methyl acrylate (MA), 11.4 grams acrylic acid (AA), 248.0 grams ethyl acetate and 0.456 grams, 2,2'-azobis(isobutyronitrile) were charged into a one liter bottle. The bottle contents were deoxygenated by purging with nitrogen at a flow rate of one liter per minute for two minutes. The bottle was sealed and placed in a rotating water bath at 55° C. for 24 hours to effect essentially complete polymerization. The resulting polymer was diluted with 300 grams of toluene. The inherent viscosity measured in ethyl acetate at a concentration of 0.15 g/dl was 1.80 dl/g.

Adhesive B Solution

A mixture of 117.9 grams butyl acrylate, 9.6 grams acrylic acid, 372.5 grams acetone and 0.19 gram 2,2'-azobis (2-methylbutane nitrile) were charged with a one liter bottle. The bottle contents were deoxygenated by purging with nitrogen at a rate of one liter per minute for 2 minutes. The bottle was sealed and placed in a rotating water bath at 57° C. for 24 hours to effect essentially complete polymerization. A 0.15 g/dl concentration solution of the resulting polymer had a measured inherent viscosity of 1.05 dl/g.

| Adhesive C Solution | Percent by Weight |
| --- | --- |
| Adhesive A Solution | 40.47 |
| Adhesive B Solution | 33.11 |
| Ethyl acetate | 25.75 |
| Ultra violet light absorber[1] | 0.37 |
| Cross linker solution[2] | 0.29 |

[1]Bis(2,4 dihydroxy phenyl)-methanone available under the tradename UVINUL ™ 3050 from BASF, Charlotte, NC.
[2]5% by weight solution of 1,1'-isophthaloyl bis (2-methylaziridine) in toluene.

Adhesive C Solution was prepared under ambient conditions by combining the above ingredients in a 55 gallon drum (208 liter) and mixing for 30 minutes with a 12 inch (30.5 cm) propeller type mixing blade at 500 rpm. The solution was left undisturbed to eliminate bubbles and then used for coating.

Adhesive C Solution had an initial viscosity of 960 cps when measured at room temperature with a Brookfield viscometer using a No. 3 spindle at 30 rpm.

| Adhesive D Solution | Percent by Weight |
| --- | --- |
| Adhesive A Solution | 73.58 |
| Ethyl acetate | 25.75 |

-continued

| Adhesive D Solution | Percent by Weight |
| --- | --- |
| Ultra violet light absorber[1] | 0.37 |
| Cross linker solution[2] | 0.29 |

[1]Bis(2,4 dihydroxy phenyl)-methanone available under the tradename UVINUL ™ 3050 from BASF, Charlotte, NC.
[2]5% by weight solution of 1,1'-isophthaloyl bis (2-methylaziridine) in toluene.

Adhesive D Solution was prepared under ambient conditions by combining the above ingredients in a 55 gallon (208 liter) drum and mixing for 30 minutes with a 12 inch (30 cm) propeller type mixing blade at 500 rpm. The solution was left undisturbed to eliminate bubbles and then used for coating.

Adhesive D Solution had an initial viscosity of 2700 cps when measured at room temperature with a Brookfield viscometer using a No. 3 spindle at 30 rpm.

Adhesive E Solution

Adhesive E Solution was a co-polyester solution commercially available under the trade designation Bostik Vitel™ from Bostik Inc. of Middleton, Mass., which was diluted to 15% solids with 80/20 by volume mixture of toluene/methyl ethyl ketone.

Hardcoat Coating Composition

Identification of Ingredients

Nalco 2327 is an aqueous dispersion (40% solids) of colloidal silica particles having an average particle diameter of 20 nanometers, available from Nalco Chemicals Co., Chicago, Ill.

Z6030 is 3-(trimethoxysilyl)propyl methacrylate available from Dow Corning Co., Midland, Mich.

PETA is pentaerythritol acrylate, available from Aldrich Chemicals Co., Milwaukee, Wis.

NNDMA is N,N-dimethyl acrylamide, available from Aldrich Chemical Co., Milwaukee, Wis.

The following ingredients were charged into a 10 liter round-bottomed flask:

| Ingredient | Weight (g.) |
| --- | --- |
| Nalco 2327 | 1195 |
| NNDMA | 118 |
| Z6030 | 120 |
| PETA | 761 |

The flask was then placed on a rotary evaporator (Bucchi™ R152 available from Bucchi Laboratory AG, Flanil, Switzerland) in a bath heated at 55° C. A refrigerated mixture 50:50 by volume water:ethylene glycol antifreeze was recirculated through the evaporator cooling coils. The volatile components were removed at a reduced pressure of about 25 Torr. until the distillation rate was reduced to less than 5 drops per minute (approximately 2 hours). The resulting material (1464 g.) was a clear liquid, containing less than 1% water (as determined by Carl Fisher Titration) which comprised 54.2 wt % PETA, 8.4 wt % NNDMA and 38.8 wt % acrylated silica. This material was dissolved in isopropyl alcohol to make a 50% solids solution, hereafter referred to as ("Hardcoat Coating Composition").

Example 1

The Hardcoat Coating Composition described above was further diluted with isopropyl alcohol to obtain a 21% solids solution to which was added 0.1% by weight of a smoothing agent (Dow™ 57). The resultant coating composition was coated by use of equipment shown in FIG. 3, with an extrusion die. The coating was applied to a polyester film (Melinex™ 454-200) to obtain, after drying and curing, a dry coating weight of 0.3 gram per square foot (3.2 grams per square meter).

The coating conditions for the equipment shown in FIG. 3 were as follows:

Extrusion die[3] opening: 4 mil (0.38 mm)
Film speed: 55 feet per minute (16.8 meters per minute)
Film tension: 1 lb/inch (0.18 kg per cm)
Oven zone temperatures: (1): 110° F. (43° C.); (2): 120° F. (49° C.); (3): 120° F. (49° C.)
Oven zone length: 40 feet (12.2 meters)
Coating width: 52 inches (1.32 meter)
UV light source: high pressure mercury bulb with parabolic reflectors—67 kw total output Two uncoated Melinex™ 454–200 films were laminated together by use of the equipment depicted in FIG. 4. The first of the films was coated with Adhesive C Solution described above using an extrusion die having an opening of 15 mils (0.38 mm) to provide a dry adhesive coating of 0.3 mil (0.008 mm). The film speed was 100 feet (30.5 meters) per minute under a tension of about 1 lb per inch (0.18 kg per cm). The oven had four 40 foot (12.2 meter) heated zones, heated as follows: (1) 80° F. (27° C.); (2) 130° F. (54° C.); (3) 220° F. (104° C.) and (4) 200° F. (93° C.). The second film was laminated to the adhesive coated side of the first film at nip rolls 47a and 47b depicted in FIG. 4. Nip roll 47a was a 16 inch (41 cm) diameter steel roll heated at 160° F. (71° C.) and roll 47b was an 18 inch (46 cm) diameter rubber roll having a Shore A durometer of 65. The rolls were forced together under a force of 20 pounds per lineal inch (3.6 kg per lineal cm).

The 2-film laminate was then laminated to the surface opposite of the hardcoated film described above by use of the equipment depicted in FIG. 4. The 2-film laminate was first coated with Adhesive C solution, as described above, by use of the extrusion die with a 15 mil (0.38 cm) opening to provide a 0.3 mil (0.008) dry adhesive coating.

The 3-film laminate was then coated on the surface opposite the hard coating with a 0.8 mil (0.02 mm) dry thickness obtained from Adhesive C Solution described above by use of the extrusion die with a 15 mil (0.38 mm) opening. The drying conditions were the same as described above except the film speed was 50 feet (15.25 meter) per minute. A 2 mil (0.05 mm) silicone coated polyester release liner was applied to surface of the adhesive. The release liner was commercially available from CP Films Corp. of Martinsville Va. under the trade designation Clearsil™ T10. The resultant laminate was then wound onto a roll and slit to commercial size.

The film produced as described above was laminated to various types of glass using a 48 inch (1.22 meter) hand powered two-roll laminator. Each roller is 4 inches (10 cm) in diameter and covered with 3/16 inch (0.48 cm) of rubber (Shore A 70 durometer). The force applied during lamination of the film to the glass was approximately 20 pounds per linear inch (3.6 kg per lineal cm).

Example 2

Example 2, which is a comparative example, was prepared in the same manner as Example 1, with the exception being that the pressure sensitive adhesive was obtained from Adhesive D Solution to show the effect of using a stiffer pressure sensitive adhesive.

Example 3

Example 3 was made according to the present invention. One uncoated Melinex™ 454-400 4 mil thick film (0.1 mm) and one uncoated Melinex TM 454-300 3 mil film (0.076 mm) were laminated together by use of the equipment depicted in FIG. 4. The first of the films was coated with Adhesive C Solution described above using a notch bar coater having a coating gap between the bar and the film of 4 mils (0.102 mm) to provide a dry adhesive coating of 0.45 mil (0.011 mm). The film speed was 10 feet (3.05 meters) per minute under a tension of about 1 lb per inch (0.18 kg per cm). The oven had three 12 foot (3.7 meter) heated zones, heated as follows: (1) 120° F. (49° C.); (2) 180° F. (82° C.); and (3) 200° F. (93° C.). The second film was laminated to the adhesive coated side of the first film at nip rolls 47a and 47b depicted in FIG. 4. Nip roll 47a was a 16 inch (41 cm) diameter steel roll heated at 160° F. and roll 47b was an 18 inch (46 cm) diameter rubber roll having a Shore A durometer of 65. The rolls were forced together under a force of 20 pounds per lineal inch (3.6 kg per lineal cm).

The 2-film laminate was then coated with a 1.0 mil (0.0254 mm) dry thickness of adhesive obtained from Adhesive C Solution described above by use of the notch bar coater with a 7 mil (0.178 mm) gap between the bar and the uncoated film. The drying conditions were the same as described above. A 2 mil (0.051 mm) silicone coated polyester release liner was applied to the dried surface of the adhesive. The release liner was commercially available from CP Films Corp. of Martinsville Va. under the trade designation Clearsil™ T10. The resultant laminate was then wound onto a roll.

Example 4

Example 4 is a comparative example which only includes a single layer of 7 mil (0.178 mm) polyester film to show the need for at least two film layers as required by the present invention. One uncoated Melinex™ 454-700 film was coated with Adhesive C Solution described above using a notch bar coater having a coating gap between the bar and the film of 7 mils (0.178 mm) to provide a dry adhesive coating of 0.8 mil (0.02 mm). The film speed was 10 feet (3.04 meters) per minute under a tension of about 1 lb per inch (0.18 kg per cm). The oven had three 12 foot (3.7 meter) heated zones, heated as follows: (1) 120° F. (49° C.); (2) 180° F. (82 C.); and (3) 200° F. (93° C.).

A 2 mil (0.05 mm) silicone coated polyester release liner was applied to surface of the adhesive. The release liner was commercially available from CP Films Corp. of Martinsville Va. under the trade designation Clearsil™ T10. The resultant laminate was then wound onto a roll.

Example 5

Example 5 is also a comparative example which, like Example 3, uses a 4 mil (0.1 mm) and a 3 mil (0.076 mm) polymer films, but with a stiffer pressure sensitive adhesive to show that the selection of the pressure sensitive adhesive is important to provide a laminate which will perform in an acceptable manner. One uncoated Melinex™ 454-400 and one uncoated Melinex TM 454-300 films were laminated together by use of the equipment depicted in FIG. 4. The first of the films was coated with Adhesive E Solution described above using a notch bar coater having a coating gap between the bar and the film of 3 mils (0.076 mm) to provide a dry adhesive coating of 0.2 mil (0.0051 mm). The film speed was 10 feet (3 meters) per minute under a tension of about 1 lb per inch (0.18 kg per cm). The oven had three 12 foot (3.7 meter) heated zones, heated as follows: (1) 120° F. (49° C.); (2) 180° F. (82.2° C.); and (3) 200° F. (93° C.). The second film was laminated to the adhesive coated side of the first film at nip rolls 47a and 47b depicted in FIG. 4. Nip roll 47a was a 16 inch (41 cm) diameter steel roll heated at 160° F. and roll 47b was an 18 inch (46 cm) diameter rubber roll having a Shore A durometer of 65. The rolls were forced together under a force of 20 pounds per lineal inch (3.6 kg per lineal cm).

The 2-film laminate was then coated with a 0.8 mil (0.02 mm) dry thickness of Adhesive D Solution described above by use of the notch bar coater with a 7 mil (0.178 mm) gap between the bar and the uncoated film. The drying conditions were the same as described above. A 2 mil (0.05 mm) silicone coated polyester release liner was applied to surface of the adhesive. The release liner was commercially available from CP Films Corp. of Martinsville Va. under the trade designation Clearsil™ T10. The resultant laminate was then wound onto a roll.

The composition of each of Examples 1–5 is set forth in Table 1.

TABLE 1

| Ex. No. | Adhesive Solution | Adhesive Modulus at 22° C. (MPa) | Layers of Film | Film Thickness (mils) | Film Thickness (mm) |
|---|---|---|---|---|---|
| 1 | C | 0.33 | 3 | 2, 2, 2 | 0.05, 0.05, 0.05 |
| 2 | D | 0.51 | 3 | 2, 2, 2 | 0.05, 0.05, 0.05 |
| 3 | C | 0.33 | 2 | 4, 3 | 0.1, 0.076 |
| 4 | C | 0.33 | 1 | 7 | 0.178 |
| 5 | D/E | 0.51/65 | 2 | 4, 3 | 0.1, 0.076 |

The tests performed on Examples 1–5 are as follows:

Boiling Water Test

The film was applied to a 4 inch by 9 inch (10.2 cm by 22.9 cm) clear glass plate then immersed in boiling water for 2 hours. After two hours the sample was removed and examined. The film was examined to see if it was still attached to the glass, bubbles developed in the adhesive layers or otherwise was altered by the boiling water. Passing this test requires that the unaltered sample still remain attached to the glass.

Impact Test

The film laminate was laminated to a number of 12 inch by 12 inch (30.5 cm by 30.5 cm) test glass plates, both laminated and tempered. The laminating device was a simple roller, approximately 20 pounds per linear inch (3.6 kg per lineal cm) force was used to adhere the film to the glass. Impact testing was conduced on 12 inch by 12 inch (30.5 by 30.5 cm) pieces of 0.17 (4.3 mm) thick laminated glass with a 30 mil (0.76 mm thick internal polyvinylbutyral interlayer) and on 12 inch by 12 inch (30.5 by 30.5 cm) ⅛ thick (3.18 mm) tempered glass. The test glass plate was held horizontally in a frame with the film laminate adhered beneath the glass plate while a 0.5 pound (0.23 kg) steel ball was dropped from 30 feet (9.14 m) onto the center of the glass plate to fracture the glass plate. The fractured assembly was then examined to see if there was tearing or ripping of the film laminate. Passing this test requires that, on at least one type of glass substrate, i.e., either laminated or tempered, the laminate is neither penetrated nor torn.

Light Transmission and Haze Testing

The film laminate was laminated to a 4 inch by 4 inch (10.2 cm by 10.2 cm) piece of 0.125 inch (3.2 mm) clear glass using a simple roller and 20 pounds per linear inch (3.6 kg per lineal cm) of force. After lamination, the specimen was tested using a Pacific Scientific™ Colorimeter model number XL-835. The device was programmed to measure visable light transmission, yellow index and haze (Function 10). Four measurements were taken from different areas of the sample, with the results being shown in Table 2.

The sample was then abraded in a Taber™ Abrader with CS-10F as the abrasive material under a 500 gram load. Results after 1000 revolutions on the Taber™ Abrader are also reported in Table 2.

The test results of testing Examples 1–5 are shown in Tables 2–4.

TABLE 2

| Example No. | Boiling Water Test | Transmission Before Abrader | | Transmission After Abrader | |
|---|---|---|---|---|---|
| | | Transmission (%) | Haze (%) | Transmission (%) | Haze (%) |
| 1 | Passed[4,5] | 90.4 | 1.75 | 90.0 | 7.2 |
| 2 | Passed[4,5] | 89.2 | 1.02 | 89.3 | 7.2 |
| 3 | Passed[4,5] | 88.6 | 2.0 | N.A.[7] | N.A.[7] |
| 4 | Passed[4,5] | 89.8 | 1.53 | N.A.[7] | N.A.[7] |
| 5 | Failed[4,6] | 89 | 1.0 | N.A.[7] | N.A.[7] |

[4]A slight haze had developed in the film but this disappeared within 24 hours.
[5]No adhesive failure or bubbles in adhesive.
[6]Small bubbles formed in the adhesive which remained after testing.
[7]Not applicable since the laminate did not include a hardcoat.

TABLE 3

Impact Testing Results - Laminated Glass

| Example No. | Penetration | Film Failure |
|---|---|---|
| 1 | no[8] | no[8] |
| 2 | no[9] | no[9] |
| 3 | no[8] | no[8] |
| 4 | no[8] | yes[11] |
| 5 | no[8] | yes[8] |

TABLE 4

Impact Testing Results - Tempered Glass

| Example No. | Penetration | Film Failure |
|---|---|---|
| 1 | yes[12] | yes[13] |
| 2 | no[9] | yes[10] |
| 3 | no[8] | no[8] |

TABLE 4-continued

Impact Testing Results - Tempered Glass

| Example No. | Penetration | Film Failure |
|---|---|---|
| 4 | yes[8] | yes[8] |
| 5 | yes[11] | yes[12] |

[8]Same result in five tests.
[9]Same result in four tests.
[10]Failed in 3 of 4 tests.
[11]Failed in 1 of 5 tests.
[12]Failed in 2 of 5 tests.
[13]Failed in 3 of 5 tests.

What is claimed is:

1. A laminate attached to window glass suitable for use in a vehicular or architectural glazing element which has reduced spall and lacerative consequences on impact fracture of the window glass; said laminate comprising:
   (a) a first lamina comprised of visible light transmissive flexible nonadhesive polymeric material having a first major surface and an opposite second major surface;
   (b) a scratch-resistant layer over said first major surface to provide an exposed surface to the laminate;
   (c) at least one additional lamina comprised of visible light transmissive flexible nonadhesive polymeric material;
   (d) a sufficient number of layers of in situ visible light transmissive pressure sensitive adhesive layers to bond said laminae together with the scratch-resistant layer exposed; and
   (e) a layer of in situ visible light transmissive ambient temperature attachable pressure sensitive adhesive to bond said laminate to window glass, wherein the total thickness of the laminate exceeds about 5 mils and the laminate exhibits a light transmittance,
   wherein said laminate exhibits a light transmittance of at least about 75%.

2. The laminate attached to window glass of claim 1 wherein each of said laminae has a thickness no greater than about 5 mils (0.13 mm).

3. The laminate attached to window glass of claim 1 wherein each of said laminae is comprised of biaxially oriented polyester film.

4. The laminate attached to window glass of claim 1 wherein said pressure sensitive adhesive is comprised of acrylic based copolymer.

5. The laminate attached to window glass of claim 1 further including a third lamina comprised of visible light transmissive flexible non-adhesive polymeric material.

6. The laminate attached to window glass of claim 1 wherein the scratch-resistant layer comprises a cured ceramer.

7. The laminate attached to window glass of claim 1 wherein said window glass comprises tempered or laminated window glass, said laminate and window glass define a glazing element which passes the following ANSI Z-26 tests:
   5.04—Two Hour Boiling Water;
   5.13—Thirty Foot (9.14 m) Ball Drop;
   5.17—Resistance to Abrasion;
   5.19—Chemical Resistance; and
   5.23—Flammability.

8. The laminate attached to window glass of claim 1 wherein said pressure sensitive adhesive layers are comprised of pressure sensitive adhesive having a shear storage modulus measured at 22° C. in the range of about 0.20 Mpa to about 0.50 Mpa.

9. The laminate attached to window glass of claim 1, wherein each of said visible light transmissive pressure sensitive adhesive layers comprises an adhesive sufficient to maintain the laminate together through the ANSI Z-26 test: 5.04—Two Hour Boiling Water.

10. The laminate attached to window glass of claim 1, wherein said attachable pressure sensitive adhesive layer comprises an adhesive including a cross linker solution.

11. The laminate attached to window glass of claim 1, wherein the laminate attached to the window glass has a percent haze less than or equal to about 2.0%.

12. The laminate attached to window glass of claim 1, wherein the laminate attached to the window glass has a percent visible light transmission greater than or equal to about 88.6%.

13. The laminate attached to window glass of claim 1, wherein the laminate attached to the window glass provides a glazing element which also passes each of the following ANSI Z-26 tests:
   5.13—Thirty Foot Ball (9.14 m) Drop;
   5.17—Resistance to Abrasion;
   5.19—Chemical Resistance; and
   5.23—Flammability.

14. The laminate attached to window glass of claim 1, wherein each of said visible light transmissive pressure sensitive adhesive layers comprises an adhesive sufficient to maintain the laminae together through the ANSI Z-26 test: 5.04—Two Hour Boiling Water.

15. The laminate attached to window glass of claim 1, wherein said scratch-resistant layer comprises a scratch-resistant hard coating.

16. The laminate attached to window glass of claim 1, wherein said pressure sensitive adhesive layers directly bond said laminae together.

17. A laminate attached to window glass as set forth in claim 1, wherein said first lamina is comprised of optically clear flexible nonadhesive polymeric material, said at least one additional lamina is comprised of optically clear flexible nonadhesive polymeric material, said sufficient number of layers of in situ adhesive layers comprise optically clear pressure sensitive adhesive layers, and said layer of in situ ambient temperature attachable pressure sensitive adhesive comprises an optically clear ambient temperature attachable pressure sensitive adhesive.

18. A vehicular or architectural glazing element comprising the laminate attached to window glass of claim 1.

19. A vehicular or architectural glazing element which has reduced spall and lacerative consequences on impact fracture, said glazing element comprising:
   (a) a laminate comprising a first laminae comprised of visible light transmissive flexible polymeric material having a first major surface and an opposite second major surface; a scratch-resistant layer over said first major surface; at least one additional lamina comprised of visible light transmissive flexible nonadhesive polymeric material; a sufficient number of layers of in situ visible light transmissive pressure sensitive adhesive layers to bond said laminae together with the scratch-resistant layer exposed; a layer of in situ visible light transmissive ambient temperature attachable pressure sensitive adhesive to bond said laminate to window glass; wherein the total thickness of the laminate exceeds about 5 mils and the laminate exhibits a light transmittance; and (b) window glass;
wherein said laminate exhibits a light transmittance of at least about 75%.

20. The glazing element of claim 19 wherein said window glass is tempered.

21. The glazing element of claim 19 wherein said pressure sensitive adhesive layers are comprised of pressure sensitive adhesive having a shear storage modulus measured at 22° C. in the range of about 0.20 MPa to about 0.50 MPa.

22. The glazing element of claim 19, wherein it passes the ANSI Z-6 test: 5.04—Two Hour Boiling Water.

23. The glazing element of claim 22, wherein it also passes at least one of the following ANSI Z-26 tests:
    5.13—Thirty Foot Ball (9.14 m) Drop;
    5.17—Resistance to Abrasion;
    5.19—Chemical Resistance; and
    5.23—Flammability.

24. The glazing element of claim 22, wherein it also passes each of the following ANSI Z-26 tests:
    5.13—Thirty Foot Ball (9.14 m) Drop;
    5.17—Resistance to Abrasion;
    5.19—Chemical Resistance; and
    5.23—Flammability.

25. The glazing element of claim 19, wherein it has a percent haze less than or equal to about 2.0%.

26. The glazing element of claim 19, wherein it has a percent visible light transmission greater than or equal to about 88.6%.

27. The glazing element of claim 19, wherein said pressure sensitive adhesive layers directly bond said laminae together.

28. The glazing element of claim 19, wherein said attachable pressure sensitive adhesive comprises a cross linker solution.

29. A glazing element as set forth in claim 19, wherein said first lamina is comprised of optically clear flexible polymeric material, said at least one additional lamina is comprised of optically clear flexible polymeric material, said sufficient number of layers of in situ adhesive layers comprise optically clear pressure sensitive adhesive layers, and said layer of in situ ambient temperature attachable pressure sensitive adhesive comprises an optically clear ambient temperature attachable pressure sensitive adhesive.

30. A laminate attached to window glass suitable for use in a vehicular or architectural glazing element comprising the following components adhered together in the following order:
    (a) a scratch-resistant layer comprised of cured ceramer;
    (b) a first biaxially oriented polyester film having a thickness of not more than 5 mils (0.13 mm);
    (c) a first pressure sensitive adhesive layer;
    (d) a second biaxially oriented polyester film having a thickness of not more than 5 mils (0.13 mm);
    (e) a second pressure sensitive adhesive layer;
    (f) a third biaxially oriented polyester film having a thickness of not more than 5 mils (0.13 mm); and
    (g) a third ambient-temperature-attachable pressure sensitive adhesive layer;
    wherein said pressure sensitive adhesive layers are comprised of pressure sensitive adhesive having a shear storage modulus measured at 22° C. in the range of about 0.20 MPa to 0.50 MPa,
    wherein said laminate comprises an optically clear laminate.

31. A vehicular or architectural glazing element comprising the laminate attached to window glass of claim 30.

32. A light transmissive laminate suited for attachment to window glass to provide a glazing element which has reduced spall and lacerative consequences on impact fracture of the window glass; said laminate comprising:
    (a) a first lamina comprised of visible light transmissive flexible nonadhesive polymeric material having a first major surface and an opposite second major surface;
    (b) a scratch-resistant layer over said first major surface to provide an exposed surface to the laminate;
    (c) at least one additional lamina comprised of visible light transmissive flexible nonadhesive polymeric material;
    (d) a sufficient number of layers of in situ visible light transmissive pressure sensitive adhesive layers to bond said laminae together with the scratch-resistant layer exposed;
    (e) a layer of in situ visible light transmissive ambient temperature attachable pressure sensitive adhesive to bond said laminate to window glass; and
    wherein the total thickness of the laminate exceeds about 5 mils, the laminate exhibits a light transmittance of at least about 75% and said pressure sensitive adhesive layers are comprised of pressure sensitive adhesive having a shear storage modulus measured at 22° C. in the range of about 0.20 Mpa to about 0.50 MPa.

33. The laminate of claim 32, wherein once attached to window glass has a percent haze less than or equal to about 2.0%.

34. The laminate of claim 32, wherein it exhibits a light transmittance of at least about 85%.

35. The laminate of claim 32, wherein said attachable pressure sensitive adhesive layer comprises an adhesive including a cross linker solution.

36. The laminate of claim 32, wherein said pressure sensitive adhesive layers directly bond said laminae together.

37. A light transmissive laminate as set forth in claim 32, wherein said first lamina is comprised of optically clear flexible nonadhesive polymeric material, said at least one additional lamina is comprised of optically clear flexible nonadhesive polymeric material, said sufficient number of layers of in situ adhesive layers comprise optically clear pressure sensitive adhesive layers, and said layer of in situ ambient temperature attachable pressure sensitive adhesive comprises an optically clear ambient temperature attachable pressure sensitive adhesive.

* * * * *

UNITED STATES PATENT AND TRADEMARK OFFICE
CERTIFICATE OF CORRECTION

PATENT NO. : 7,238,401 B1 Page 1 of 1
APPLICATION NO. : 09/591584
DATED : July 3, 2007
INVENTOR(S) : Peter T. Dietz It is certified that error appears in the above-identified patent and that said Letters Patent is hereby corrected as shown below:

Column 4 – Line 39 (Approx.) - Delete "&" and insert -- N-substituted --, therefor.

Column 9 – Line 19 - Delete "grams," and insert -- grams --, therefor.

Column 10 – Line 25 (Approx.) - Before "from" insert -- 3300 --.

Column 10 – Line 35 (Approx.) - Delete "(trimethoxysilyl)propyl" and insert -- (trimethoxysilyl) propyl --, therefor. (Consider Space)

Column 11 – Line 15 - Below "(0.38 mm)" insert -- [3]Disclosed in U.S. Patent Nos. 5,741,549 and 5,759,274. --.

Column 13 – Line 64 - After "0.17" insert -- inch --.

Column 13 – Line 66 - After "1/8" insert -- inch --.

Column 16 – Line 7 - In Claim 9, delete "laminate" and insert -- laminae --, therefor.

Column 16 – Line 53 - In Claim 19, delete "laminae" and insert -- lamina --, therefor.

Column 17 – Line 1 - In Claim 19, delete "glass;" and insert -- glass, --, therefor.

Column 17 – Line 11 - In Claim 22, delete "Z-6" and insert -- Z-26 --, therefor.

Signed and Sealed this

Twenty-first Day of October, 2008

JON W. DUDAS
*Director of the United States Patent and Trademark Office*